United States Patent
Chiu et al.

(10) Patent No.: US 9,436,406 B2
(45) Date of Patent: Sep. 6, 2016

(54) MIGRATION DECISION WINDOW SELECTION BASED ON HOTSPOT CHARACTERISTICS

(71) Applicant: International Business Machines Corporation, Armonk, NY (US)

(72) Inventors: Lawrence Y. Chiu, Saratoga, CA (US); Sangeetha Seshadri, San Jose, CA (US); Yang Zhou, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 14/324,276

(22) Filed: Jul. 7, 2014

(65) Prior Publication Data

US 2016/0004473 A1 Jan. 7, 2016

(51) Int. Cl.
*G06F 3/06* (2006.01)

(52) U.S. Cl.
CPC ............ *G06F 3/0649* (2013.01); *G06F 3/067* (2013.01); *G06F 3/0608* (2013.01)

(58) Field of Classification Search
CPC ..... G06F 3/0649; G06F 3/0608; G06F 3/067
See application file for complete search history.

(56) References Cited

U.S. PATENT DOCUMENTS

| 8,365,023 | B2 | 1/2013 | Chiu et al. | |
|---|---|---|---|---|
| 2006/0110028 | A1* | 5/2006 | Liu | G06K 9/6292 382/159 |
| 2009/0210371 | A1* | 8/2009 | Laan | G06K 9/6292 706/21 |
| 2010/0138620 | A1* | 6/2010 | Jess | G06F 3/0605 711/162 |
| 2012/0198107 | A1* | 8/2012 | McKean | G06F 13/18 710/40 |
| 2013/0111172 | A1* | 5/2013 | Gao | G06F 12/02 711/165 |
| 2013/0212103 | A1* | 8/2013 | Cao | G06F 17/30303 707/737 |

OTHER PUBLICATIONS

Grace Period Disclosure—Sangeetha Seshadri et al., Article entitled "GraphLens: Mining Enterprise Storage Workloads Using Graph Analytics", presented at IEEE BigData 2014 Conference, Anchorage, Alaska; Jun. 28, 2014, 8 pages.
Grace Period Disclosure—Sangeetha Seshadri et al., PowerPoint Presentation entitled "GraphLens: Mining Enterprise Storage Workloads Using Graph Analytics", presented at IEEE BigData 2014 Conference, Anchorage, Alaska; Jun. 28, 2014, 39 pages.
White Paper, "EMC Fast VP for Unified Storage Systems," Oct. 2011, 26 pages.
http://searchstorage.techtarget.com/feature/Sub-LUN-tiering-Five-key-questions-to-consider, Oct. 2013, 15 pages.
Dufrasne et al., "IBM System Storage DS8000 Easy Tier," Redpaper, IBM.com/redbooks, Aug. 2013, 172 pages.

* cited by examiner

*Primary Examiner* — Eric Oberly
(74) *Attorney, Agent, or Firm* — Cantor Colburn LLP; Bryan Butler

(57) ABSTRACT

Methods and arrangements for selecting a migration decision window for hotspots in a multi-tier enterprise storage system. Aspects include collecting usage statistics for data stored in the multi-tier enterprise storage system, identifying hotspots from data stored in the multi-tier enterprise storage system based on the usage statistics, and determining one or more characteristics of the identified hotspots. Aspects further include calculating an average lifespan of the identified hotspots based on the one or more characteristics of the identified hotspots and selecting the migration decision window based on the average lifespan of the identified hotspots and the one or more characteristics of the identified hotspots.

20 Claims, 4 Drawing Sheets

MIGRATION DECISION WINDOW SELECTION BASED ON HOTSPOT CHARACTERISTICS

STATEMENT REGARDING PRIOR DISCLOSURES BY THE INVENTOR OR A JOINT INVENTOR

The following disclosure(s) is/are submitted under 35 U.S.C. 102(b)(1)(A): GraphLens: Mining Enterprise Storage Workloads Using Graph Analytics, Sengeetha Seshadri; Lawrence Chiu; Yang Zhou and Ling Liu; Jun. 28, 2014; IEEE BigData 2014 Conference; Anchorage, Ak. (along with accompanying PowerPoint Presentation).

BACKGROUND

The present invention relates to storage of data in a multi-tier storage system, and more specifically, to selecting a migration decision window for stored data based upon characteristics of hotspots in the multi-tier enterprise storage system.

In general, multi-tier enterprise storage systems include at least two types of data storage devices that have different performance characteristics. These multi-tier enterprise storage systems are designed to optimize system performance and maximize utilization of the storage devices by migrating hot data to faster storage devices, such as solid state devices (SSDs) and cold data to appropriate storage device types, such as hard disk drives (HDDs). As used herein, the term hot data refers to data that experiences a relatively large number of random accesses and the term cold data refers to data that experiences a relatively large number of sequential accesses or data that experiences a relatively low number of total accesses. In general, hotspots, which are storage areas that contain hot data, in multi-tier enterprise storage systems are dynamic, that is the locations of hotspots change over time. For example, a particular portion of storage may be considered a hotspot for a specific period of time and will not be considered a hotspot during another period of time.

Typically, access statistics for data stored in the multi-tier enterprise storage systems are collected over time and periodically reviewed. These statistics are evaluated at regular intervals, often by an automated algorithm, referred to as a decision window, in order to identify which data is hot and which data is cold. In currently available systems, the decision window is a static system parameter that is set by an administrator. In general, a static decision window may result in sub-optimal system performance and sub-optimal utilization of the storage devices in the multi-tier enterprise storage systems. For example, a decision window which is much longer than the duration of a hotspot may result in poor responsiveness in the system, since the hot data is not placed on a faster storage device in time for the large number of accesses.

SUMMARY

Methods, systems and computer program products for selecting a migration decision window for hotspots in a multi-tier enterprise storage system are provided. Aspects include collecting usage statistics for data stored in the multi-tier enterprise storage system, identifying hotspots from data stored in the multi-tier enterprise storage system based on the usage statistics, and determining one or more characteristics of the identified hotspots. Aspects further include calculating an average lifespan of the identified hotspots based on the one or more characteristics of the identified hotspots and selecting the migration decision window based on the average lifespan of the identified hotspots and the one or more characteristics of the identified hotspots.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include methods, systems and computer program products for selecting a migration decision window based upon characteristics of hotspots in a multi-tier enterprise storage system. In exemplary embodiments, the migration decision window selection process is a continuously running process and, as a result, the migration decision window is dynamic and changes overtime. In exemplary embodiments, the migration decision window will change in response to changes in the characteristics of hotspots in the multi-tier enterprise storage system.

Figure 1:
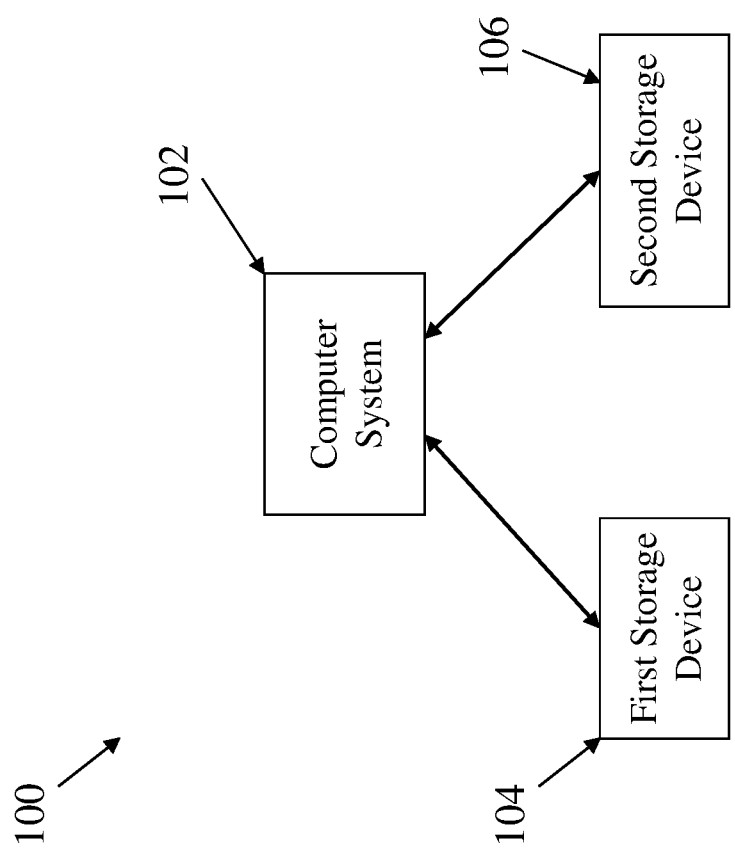
FIG. 1 depicts a block diagram of a multi-tier enterprise storage system in accordance with an exemplary embodiment.

Referring now to FIG. 1, a block diagram of a multi-tier enterprise storage system 100 in accordance with an exemplary embodiment is shown. As illustrated the system 100 includes a computer system 102 which is in communication with a first storage device 104 and a second storage device 106. In exemplary embodiments, the first storage device 104 includes one or more high performance storage devices such as SSDs and the second storage device 106 includes one or more low performance storage devices, such as HDDs. In exemplary embodiments, the computer system 102 manages data stored on both the first storage device 104 and the second storage device 106 in data blocks of a predetermined size. For example, the computer system 102 may manage the data in one gigabyte blocks, referred to herein as extents. In exemplary embodiments, the computer system 102 monitors the usage characteristics of each extent and determines which of the two storage devices to store each extent on. In general, extents that contain hot data and are identified as hotspots are stored on the first storage device 104 and the other extents are stored on the second storage device 106.

Figure 2:
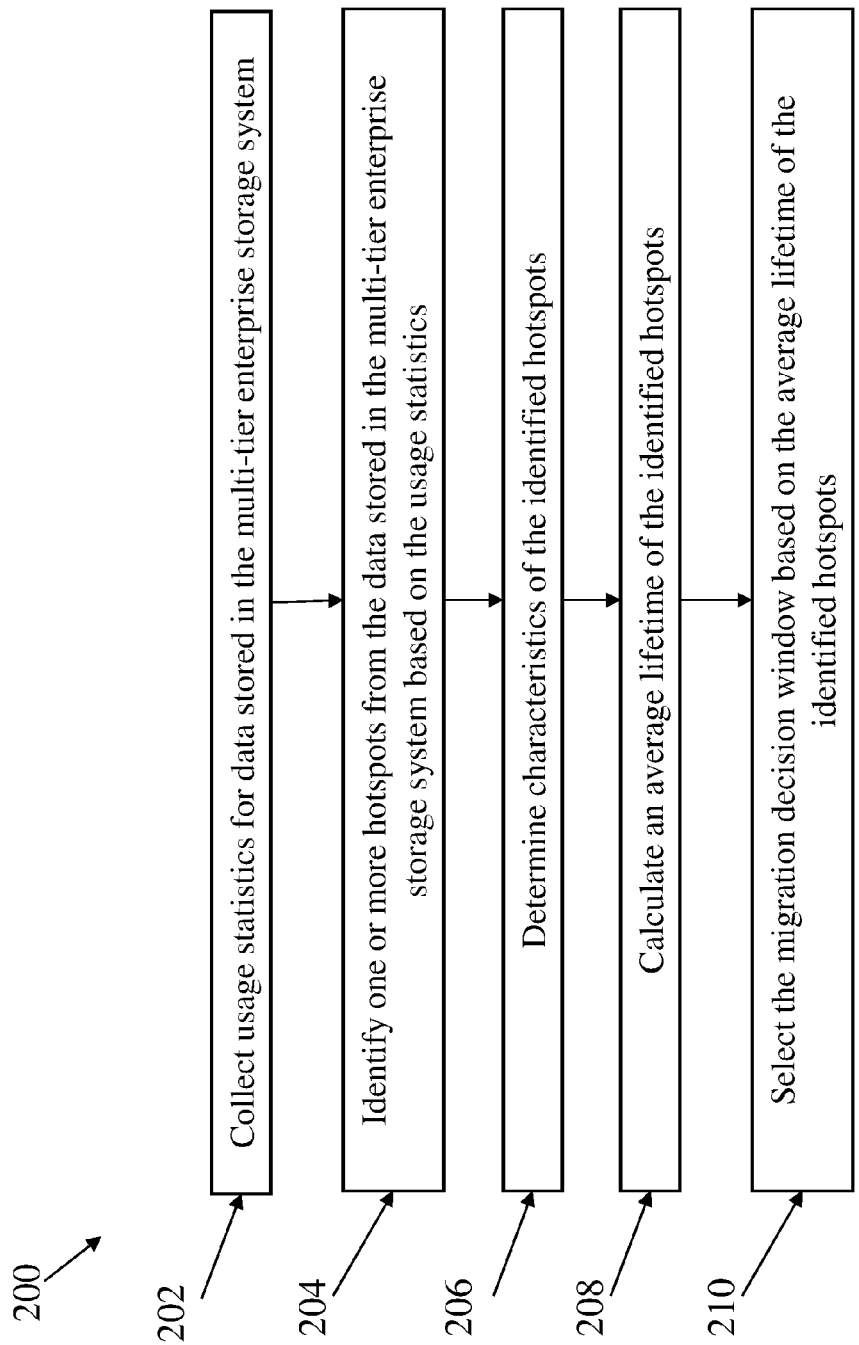
FIG. 2 depicts a flowchart diagram of a method for selecting a migration decision window in accordance with an exemplary embodiment.

Referring now to FIG. 2, a flowchart diagram of a method 200 for selecting a migration decision window based upon characteristics of hotspots in a multi-tier enterprise storage system in accordance with an exemplary embodiment is shown. As illustrated at block 202, the method 200 includes collecting usage statistics for data stored in the multi-tier enterprise storage system. In exemplary embodiments, the usage statistics are collected for each extent and include, but are not limited to, an average input/output (I/O) size, a I/O count, a sequential read count, a random read count, a sequential write count, a random write count, and a latency. In exemplary embodiments, the usage statistics are collected for each extent periodically, such as every five or ten minutes.

Next, as shown at block 204, the method 200 includes identifying one or more hotspots from the data stored in the multi-tier enterprise storage system based on the usage statistics. As illustrated at block 206, the method 200 includes determining characteristics of the identified hotspots. In exemplary embodiments, the characteristics of the identified hotspots include, but are not limited to, a lifespan of the hotspot and the size of the hotspot. Next, as shown at block 208, the method 200 includes calculating an average lifespan of the identified hotspots. As illustrated at block 210, the method 200 includes selecting the migration decision window based on the average lifespan of the identified hotspots.

In exemplary embodiments, the migration decision window may be selected to be a time period equal to half of the average lifespan of the identified hotspots if the average lifespan of the identified hotspots is above a minimum threshold value. If the average lifespan of the identified hotspots is below the minimum threshold value, the migration decision window may be selected to be a default time period set by an administrator. In exemplary embodiments, the minimum threshold value is used to ensure that hotspots which have a very short lifespan are not moved to the high performance storage device. In many cases, by the time hotspots with very short lifespans are migrated, the hotspot is no longer hot and the migration was a waste of computing resources.

In one embodiment, the average hotspot lifespan is calculated to be l cycles, the size of an identified hotspot is calculated to be z extents, and the migration bandwidth is determined to be x extents per cycle. The migration bandwidth is the amount of data per cycle that the computer system can move between the first storage device and the second storage device. In exemplary embodiments, the decision window d can be calculated by the formula:

$$d = \left\lceil \frac{l}{2} \right\rceil.$$

In exemplary embodiments, a hotspot will not be migrated if the average lifespan of the hotspot indicates that the hotspot will end before half of the hotspot is migrated. In other words, the hotspot will not be migrated if the following equation is true:

$$d + \frac{z}{2x} \geq l.$$

Figure 3:
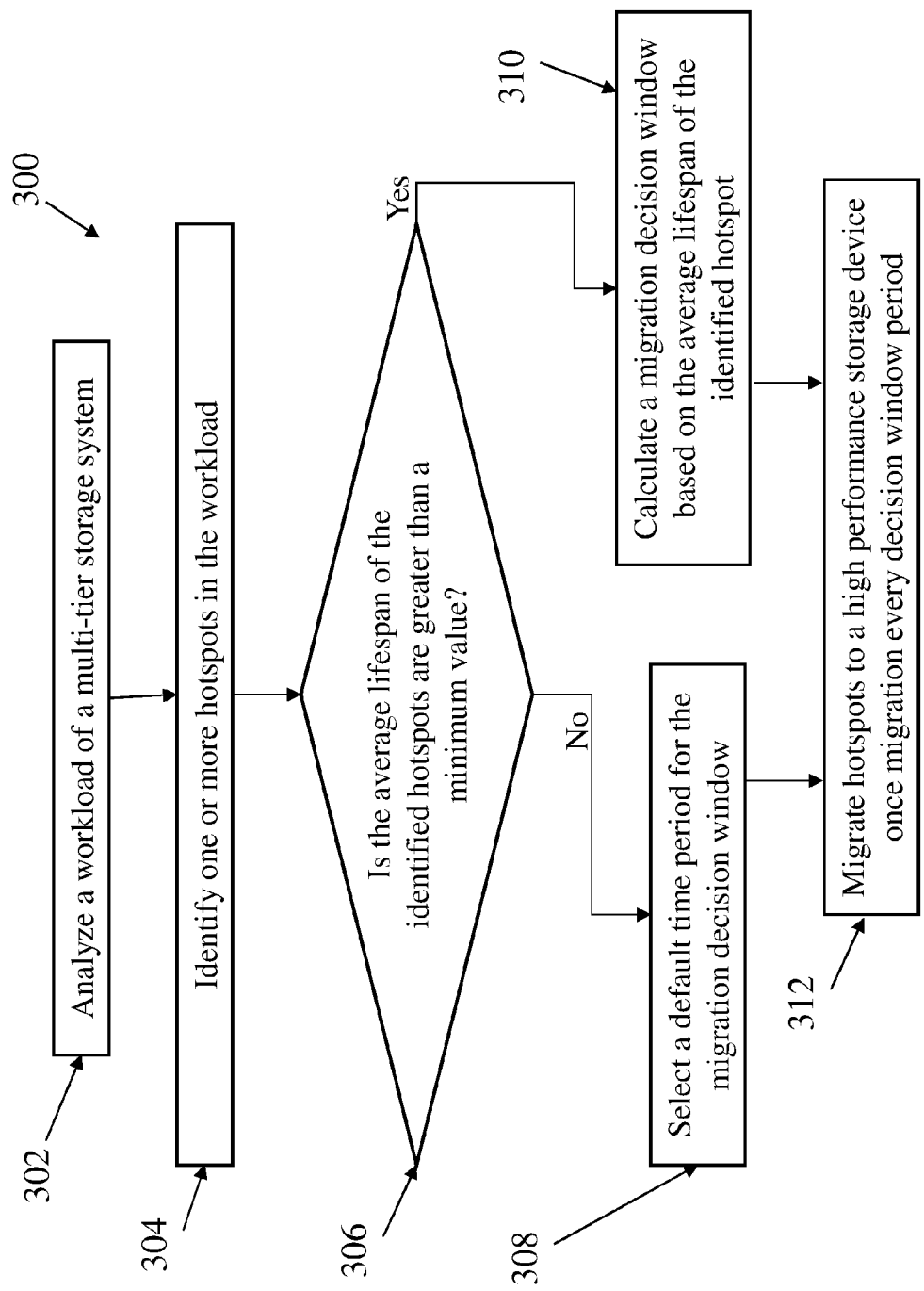
FIG. 3 depicts a flowchart diagram of another method for selecting a migration decision window in accordance with an exemplary embodiment.

Referring now to FIG. 3, a flowchart diagram of a method 300 for selecting a migration decision window based upon characteristics of hotspots in a multi-tier enterprise storage system in accordance with an exemplary embodiment is shown. As illustrated at block 302, the method 300 includes analyzing a workload of a multi-tier storage system. Next, as shown at block 304, the method includes identifying one or more hotspots in the workload. In exemplary embodiments, any of a variety of known techniques can be used to identify one or more hotspots in the workload. As illustrated at decision block 306, the method 300 includes determining if the average lifespan of the identified hotspots are greater than a minimum value. In exemplary embodiments, the minimum value is determined based on the average lifespan of the identified hotspots, the size of the identified hotspots and the migration bandwidth of the multi-tier storage system. If the average lifespan of the identified hotspots is greater than the minimum value, the method 300 proceeds to block 310 and includes calculating a migration decision window based on the average lifespan of the identified hotspot. Otherwise, the method 300 proceeds to block 308 and includes selecting a default time period for the migration decision window. After the migration decision window has been selected, the method 300 proceeds to block 312 and includes migrating hotspots to a high performance storage device once migration every decision window period.

In one embodiment the decision on which hotspots to migrate may also be based on the size of the first storage device. For example, in one embodiment the identified hotspots may be placed in a ranked list based on how hot the hotspots are and the hotspots may be migrated until the first storage device reaches capacity. In another embodiment, the decision on which hotspots to migrate may also be based on the predetermined threshold of hot data. For example, in one embodiment each of the identified hotspots may include a score that represents how hot the data in the hotspot is based on the access statistics of the extents in the hotspot and only hotspots which have a score that is above the predetermined threshold will be migrated.

In exemplary embodiments, hotspots that have a size that exceeds a maximum size may not be migrated. For example, in one embodiment if a hotspot is determined to have a size that is greater than half of the size of the first storage device, the hotspot may not be migrated to the first storage device.

Technical effects and benefits include a multi-tier enterprise storage system that dynamically determines a migration decision window for identified hotspots in the multi-tier enterprise storage system, which results in optimal system performance, particularly improved responsiveness, and optimal utilization of the storage devices in the multi-tier enterprise storage system.

Figure 4:
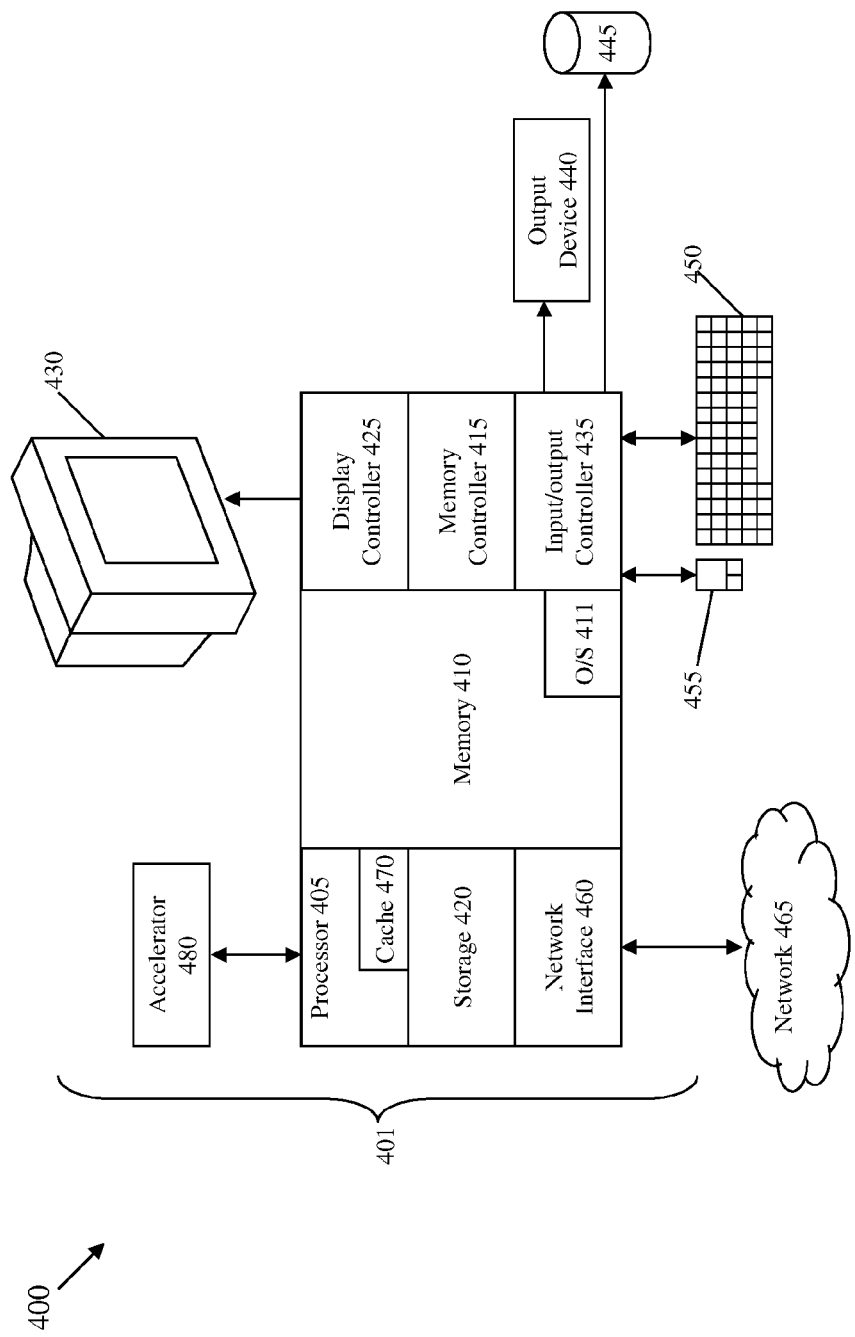
FIG. 4 depicts a block diagram of a computer system for practicing the teachings herein according to an embodiment.

Referring now to FIG. 4, a block diagram of an exemplary computer system 400 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 400 therefore includes general-purpose computer 401.

In an exemplary embodiment, in terms of hardware architecture, as shown in FIG. 4, the computer 401 includes a processor 405, memory 440 coupled via a memory controller 445, a storage device 420, and one or more input and/or output (I/O) devices 440, 445 (or peripherals) that are communicatively coupled via a local input/output controller 435. The input/output controller 435 can be, for example, but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 420 may include one or more hard disk drives (HDDs), solid state drives (SSDs), or any other suitable form of storage.

The processor 405 is a computing device for executing hardware instructions or software, particularly that stored in memory 440. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions. The processor 405 may include a cache 470, which may be organized as a hierarchy of more cache levels (L1, L2, etc.).

The memory 440 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 440 may incorporate electronic, magnetic, optical, and/or other types of storage media. Note that the memory 440 can have a distributed architecture, where various components are situated remote from one another, but can be accessed by the processor 405.

The instructions in memory 440 may include one or more separate programs, each of which comprises an ordered listing of executable instructions for implementing logical functions. In the example of FIG. 4, the instructions in the memory 440 include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as Wi-Fi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 440 may further include a basic input output system (BIOS) (omitted for simplicity). The BIOS is a set of essential routines that initialize and test hardware at startup, start the OS 411, and support the transfer of data among the storage devices. The BIOS is stored in ROM so that the BIOS can be executed when the computer 401 is activated.

When the computer 401 is in operation, the processor 405 is configured to execute instructions stored within the memory 440, to communicate data to and from the memory 440, and to generally control operations of the computer 401 pursuant to the instructions. In exemplary embodiments, the computer system 400 includes one or more accelerators 480 that are configured to communicate with the processor 405. The accelerator 480 may be a field programmable gate array (FPGA) or other suitable device that is configured to perform specific processing tasks. In exemplary embodiments, the computer system 400 may be configured to offload certain processing tasks to an accelerator 480 because the accelerator 480 can perform the processing tasks more efficiently than the processor 405.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for migrating storage hotspots in a multi-tier enterprise storage system, comprising:
    collecting usage statistics for data stored in the multi-tier enterprise storage system in real-time;
    identifying a plurality of hotspots from data stored in the multi-tier enterprise storage system based on the usage statistics collected;
    determining one or more characteristics of the plurality of hotspots identified;
    calculating an average lifespan of the plurality of hotspots identified based on the one or more characteristics of the plurality of hotspots identified; and
    migrating the plurality of hotspots identified in real-time to one or more high performance storage devices based on the average lifespan of the plurality of hotspots identified and the one or more characteristics of the plurality of hotspots identified.

2. The method of claim 1, wherein the one or more characteristics of the plurality of hotspots identified comprise at least one of a lifespan of the plurality of hotspots identified and a size of the plurality of hotspots identified.

3. The method of claim 1, wherein the migration decision window is selected to be half of the average lifespan of the plurality of hotspots identified.

4. The method of claim 1, wherein the migration decision window is selected to be a predetermined value if the average lifespan of the plurality of hotspots identified is below a minimum threshold value.

5. The method of claim 4, wherein the minimum threshold value is based on a migration bandwidth of the multi-tier enterprise storage system.

6. The method of claim 1, wherein the usage statistics comprise at least one of:
    an average input/output (I/O) size;
    an I/O count, a sequential read count;
    a random read count;
    a sequential write count;
    a random write count; and
    a latency.

7. A computer program product for migrating storage hotspots in a multi-tier enterprise storage system, comprising:
- a non-transitory computer readable storage medium storing computer executable instructions, when executed by a processor of the multi-tier enterprise storage system, the computer executable instructions cause the processor to perform:
- collecting usage statistics for data stored in the multi-tier enterprise storage system in real-time;
- identifying a plurality of hotspots from data stored in the multi-tier enterprise storage system based on the usage statistics collected;
- determining one or more characteristics of the plurality of hotspots identified;
- calculating an average lifespan of the plurality of hotspots identified based on the one or more characteristics of the plurality of hotspots identified; and
- migrating the plurality of hotspots identified in real-time to one or more high performance storage devices based on the average lifespan of the plurality of hotspots identified and the one or more characteristics of the plurality of hotspots identified.

8. The computer program product of claim 7, wherein the one or more characteristics of the plurality of hotspots identified comprise at least one of a lifespan of the plurality of hotspots identified and a size of the plurality of hotspots identified.

9. The computer program product of claim 7, wherein the migration decision window is selected to be half of the average lifespan of the plurality of hotspots identified.

10. The computer program product of claim 7, wherein the migration decision window is selected to be a predetermined value if the average lifespan of the plurality of hotspots identified is below a minimum threshold value.

11. The computer program product of claim 10, wherein the minimum threshold value is based on a migration bandwidth of the multi-tier enterprise storage system.

12. The computer program product of claim 7, wherein the usage statistics comprise at least one of:
- an average input/output (I/O) size;
- an I/O count, a sequential read count;
- a random read count;
- a sequential write count;
- a random write count; and
- a latency.

13. A multi-tier enterprise storage system comprising:
- a plurality of storage devices;
- a computer system in communication with the plurality of storage devices, having a processor and a non-transitory computer readable storage medium storing computer executable instructions, when executed by the processor of the computer system, the computer executable instructions cause the processor to perform:
- collecting usage statistics for data stored in the multi-tier enterprise storage system in real-time;
- identifying a plurality of hotspots from data stored in the multi-tier enterprise storage system based on the usage statistics collected;
- determining one or more characteristics of the plurality of hotspots identified;
- calculating an average lifespan of the plurality of hotspots identified based on the one or more characteristics of the plurality of hotspots identified; and
- migrating the plurality of hotspots identified in real-time to one or more high performance storage devices based on the average lifespan of the plurality of hotspots identified and the one or more characteristics of the plurality of hotspots identified.

14. The multi-tier enterprise storage system of claim 13, wherein the computer system is configured to:
- manage data storage among the plurality of storage devices; and
- migrate data among the plurality of storage devices.

15. The multi-tier enterprise storage system of claim 13, wherein the plurality of storage devices comprises:
- one or more high performance storage devices; and
- one or more low performance storage devices.

16. The multi-tier enterprise storage system of claim 13, wherein the one or more characteristics of the plurality of hotspots identified comprise at least one of a lifespan of the plurality of hotspots identified and a size of the plurality of hotspots identified.

17. The multi-tier enterprise storage system of claim 13, wherein the migration decision window is selected to be half of the average lifespan of the plurality of hotspots identified.

18. The multi-tier enterprise storage system of claim 13, wherein the migration decision window is selected to be a predetermined value if the average lifespan of the plurality of hotspots identified is below a minimum threshold value.

19. The multi-tier enterprise storage system of claim 18, wherein the minimum threshold value is based on a migration bandwidth of the computer system.

20. The multi-tier enterprise storage system of claim 13, wherein the usage statistics comprise at least one of:
- an average input/output (I/O) size;
- an I/O count, a sequential read count;
- a random read count;
- a sequential write count;
- a random write count; and
- a latency.

* * * * *